(12) United States Patent
Kowalik et al.

(10) Patent No.: US 9,810,800 B2
(45) Date of Patent: Nov. 7, 2017

(54) METHOD OF CREATING AND INTERPRETING ANIMATED MOSAICS OF MULTIPLE SEISMIC SURVEYS (71) Applicant: Chevron U.S.A. Inc., San Ramon, CA (US)

(72) Inventors: William S. Kowalik, Applecross (AU); Antony Marsh, Churchlands (AU)

(73) Assignee: CHEVRON U.S.A. INC., San Ramon, CA (US)

( * ) Notice: Subject to any disclaimer, the term of this patent is extended or adjusted under 35 U.S.C. 154(b) by 675 days.

(21) Appl. No.: 14/265,581

(22) Filed: Apr. 30, 2014

(65) Prior Publication Data

US 2015/0316670 A1    Nov. 5, 2015

(51) Int. Cl.
*G01V 1/30* (2006.01)
*G01V 1/34* (2006.01)

(52) U.S. Cl.
CPC .............. *G01V 1/302* (2013.01); *G01V 1/301* (2013.01); *G01V 1/345* (2013.01); *G01V 2210/643* (2013.01)

(58) Field of Classification Search
CPC ........ G01V 1/302; G01V 1/345; G01V 1/301; G01V 2210/643
See application file for complete search history.

(56) References Cited

U.S. PATENT DOCUMENTS

| 4,672,545 A | 6/1987 | Lin et al. |
| 5,671,344 A | 9/1997 | Stark |
| 6,690,820 B2 | 2/2004 | Lees et al. |
| 7,769,545 B2 | 8/2010 | Lomask et al. |
| 8,447,524 B2 | 5/2013 | Chen et al. |
| 2006/0184488 A1* | 8/2006 | Wentland ................. G01V 1/30 706/45 |

(Continued)

FOREIGN PATENT DOCUMENTS

WO    2009/136387 A1    11/2009

OTHER PUBLICATIONS

Fu, Qiang, et al.; "Applications of Automatic Seismic Image Flattening and Edge Detection to Land Seismic Data"; SEG Denver 2010 Annual Meeting; pp. 1382-1386.

(Continued)

*Primary Examiner* — Mohamed Charioui
*Assistant Examiner* — Jeremy Delozier (57) ABSTRACT

Embodiments of methods of creating and interpreting animated mosaics of multiple seismic surveys are disclosed herein. Volumes from individual seismic surveys may be flattened in each seismic cube. Animations/movies may then be produced by capturing a series of z-slice movie frames through each of the flattened volumes. The individual sets of movie frames are geo-referenced to a basemap image of well locations using appropriate composition software. Where overlap exists between surveys, the surveys are prioritized and lower priority volumes are masked by higher priority volumes. This technique provides a matched, unbroken image across overlapping volumes at each stratigraphic layer. As the movie or animation plays, a moving arrow pointer shows the vertical position of the current movie frame on a stratigraphic section consisting of a seismic reference section that is optionally labelled with suitable regional sequence names and other stratigraphic zonation data.

21 Claims, 11 Drawing Sheets

(56) References Cited

U.S. PATENT DOCUMENTS

| 2008/0165186 | A1 | 7/2008 | Lin |
| 2010/0214870 | A1 | 8/2010 | Pepper et al. |
| 2012/0197532 | A1* | 8/2012 | Posamentier .......... G01V 1/345 |
| | | | 702/14 |
| 2013/0257879 | A1 | 10/2013 | Kurtenbach |

OTHER PUBLICATIONS

International Search Report, dated Apr. 20, 2015, during the prosecution of International Application No. PCT/US2015/015135.
Written Opinion of the International Searching Authority, dated Apr. 20, 2015, during the prosecution of International Application No. PCT/US2015/015135.
De Groot, et al.; "How to Create and Use 3D Wheeler Transformed Seismic Volume"; Retrieved on Dec. 8, 2013 from http://onepetro.org/mslib/servlet/onepetropreview?id=SEG-2006-1038, pp. 1-2.
Hoyes, Jack, et al.; "A Review of "Global" Interpretation Methods for Automated 3D Horizon Picking"; The Leading Edge, Jan. 2011, pp. 936-943.
"OpendTect User Documentation version 4.6—OpendTect Trees and Elements"; Chapter 4.2. Inline, Crossline & Z-slice, Retrieved on Dec. 9, 2013 from http://ww.opendtect.org/rel/doc/User/base/chapter4.2_inline-crossline-Z-slice.htm pp. 1-3.
"Petrel Seismic Interpretation"; Retrieved on Dec. 9, 2013 from http://www.software.sib.com/Store/Seismic-Interpretation-ASVI-B1_0, pp. 1-2.

* cited by examiner

METHOD OF CREATING AND INTERPRETING ANIMATED MOSAICS OF MULTIPLE SEISMIC SURVEYS

CROSS-REFERENCE TO RELATED APPLICATIONS

Not applicable.

STATEMENT REGARDING FEDERALLY SPONSORED RESEARCH OR DEVELOPMENT

Not applicable

BACKGROUND

Field of the Invention

This invention relates generally to the field of geophysical exploration for hydrocarbons. More specifically, the invention relates to methods of creating and interpreting mosaics of multiple seismic surveys.

Background of the Invention

A seismic survey is a method of imaging the subsurface of the earth by delivering acoustic energy down into the subsurface and recording the signals reflected from the different rock layers below. The source of the acoustic energy typically comes from a seismic source such as without limitation, explosions or seismic vibrators on land, and air guns in marine environments. During a seismic survey, the seismic source may be moved across the surface of the earth above the geologic structure of interest. Each time a source is detonated or activated, it generates a seismic signal that travels downward through the earth, is reflected, and, upon its return, is recorded at different locations on the surface by receivers. The recordings or traces are then combined to create a profile of the subsurface that can extend for many miles. In a two-dimensional (2D) seismic survey, the receivers are generally laid out along a single straight line, whereas in a three-dimensional (3D) survey the receivers are distributed across the surface in a grid pattern. A 2D seismic line provides a cross sectional picture (vertical slice) of the earth layers as arranged directly beneath the recording locations. A 3D survey produces a data "cube" or volume that theoretically represents a 3D picture of the subsurface that lies beneath the survey area.

In the oil and gas industry, the primary goal of seismic exploration is locating subterranean features of interest within a seismic volume processed from data from a single seismic survey. However, on occasion, examining subterranean features of interest over a larger region encompassing multiple surveys is desirable. Current geophysical interpretation technology provides for limited manipulation and rendering of more than one seismic survey at a time. Present technology only provides the capabilities to couple z-slices from multiple volumes within a single seismic survey and to render a seismic volume in this fashion. Also, some systems can display multiple 3D surveys at a time in one window, but manipulation of the data is cube-by-cube and is therefore cumbersome and time consuming. One current solution that allows rendering of z-slices of multiple surveys is to first merge the data from these surveys into one single survey. Another solution is to take static pictures through amplitude extractions from individual seismic surveys at multiple levels and then build composite regional maps using these inputs. However, the first solution is time consuming and expensive while the second solution is static, and does not provide a dynamic display through all the adjacent seismic surveys Consequently, there is a need for methods and systems of creating and interpreting mosaics of multiple seismic surveys.

BRIEF SUMMARY

Embodiments of methods of creating and interpreting animated mosaics of multiple seismic surveys are disclosed herein. Volumes from individual seismic surveys may be flattened in each seismic cube. Animations/movies (2D or 3D) may then be produced by capturing a series of z-slice movie frames through each of the flattened volumes. The individual sets of movie frames for a given seismic survey are geo-referenced to a basemap image of well locations using appropriate composition software. Where overlap exists between seismic surveys, the surveys are prioritized and lower priority surveys are masked by higher priority surveys. This technique provides a matched, unbroken image across overlapping seismic surveys at each z-slice in the seismic survey. As the z-slice movie or animation plays, a moving arrow pointer shows the vertical position of the current movie frame on a stratigraphic section consisting of a flattened seismic reference section that is optionally labelled with suitable regional sequence names and other stratigraphic zonation data.

Two outputs may be created from the methods: 1) a final movie animation of the mosaic and 2) a series of sequential images corresponding to each frame/z-slice from the movie which are assembled into 3D geo-referenced seismic volumes. The first output may provide a valuable insight to regional geologic patterns without having to employ a commercial interpretation software. The second output allows interpretation of regional geologic patterns in a commercial interpretation software package. Thus, the disclosed methods may provide quicker access to the regional results and an interpretation solution.

In an embodiment, a method of creating a mosaic from a plurality of different seismic surveys comprises (a) selecting a plurality of seismic input volumes, wherein each seismic input volume is a result of a different seismic survey and the seismic input volumes are representative of one or more subterranean regions of interest which are at least partially adjacent to one another, and wherein each seismic input volume comprises one or more horizons. The method further comprises (b) aligning the horizons of each seismic input volume to the horizons of the other seismic input volumes. In addition, the method comprises (c) performing a flattening operation for each seismic input volume to create a plurality of flattened seismic input volumes. The method also comprises (d) rendering each flattened seismic volume to create a stack of digital images representing at least a portion of the horizons in each flattened seismic volume. The method additionally comprises (e) aligning each stack of digital images representing each flattened seismic volume geographically on to a basemap; and (f) digitally compositing the stacks of digital images to create an animated mosaic of the plurality of seismic input volumes, the animated mosaic comprising an animated progression through the one or more horizons of all the seismic input volumes, wherein at least one of (a) through (f) is performed on a computer.

In another embodiment, a computer system for creating a mosaic from a plurality of different seismic surveys comprises an interface for receiving a 3D seismic input volume, the 3D seismic input volume comprising a plurality of seismic traces. The computer system further comprises a memory resource. In addition, the computer system comprises input and output functions for presenting and receiving communication signals to and from a human user. The computer system also comprises one or more central processing units for executing program instructions and program memory coupled to the central processing unit for storing a computer program including program instructions that when executed by the one or more central processing units, cause the computer system to perform a plurality of operations for creating and/or interpreting an animated mosaic of multiple seismic surveys. The plurality of operations comprise: (a) selecting a plurality of seismic input volumes, wherein each seismic input volume is a result of a different seismic survey and the seismic input volumes are representative of one or more subterranean regions of interest which are at least partially adjacent to one another, and wherein each seismic input volume comprises one or more horizons. The operations further comprise (b) aligning the horizons of each seismic input volume to the horizons of the other seismic input volumes. In addition, the operations comprise (c) performing a flattening operation for each seismic input volume to create a plurality of flattened seismic input volumes. The operations also comprise (d) rendering each flattened seismic volume to create a stack of digital images representing at least a portion of the horizons in each flattened seismic volume. The operations additionally comprise (e) aligning each stack of digital images representing each flattened seismic volume geographically on to a basemap; and (f) digitally compositing the stacks of digital images to create an animated mosaic of the plurality of seismic input volumes, the animated mosaic comprising an animated progression through the one or more horizons of all the seismic input volumes, wherein at least one of (a) through (f) is performed on a computer.

The foregoing has outlined rather broadly the features and technical advantages of the invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. This document does not intend to distinguish between components that differ in name but not function.

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

As used herein, "adjacent" refers to seismic surveys which at least a portion of the surveys are contiguous or adjoining to one another.

As used herein, a "horizon" refers to a distinctive chronostratigraphic layer or bed with a characteristic seismic expression.

As used herein, a "seismic volume," a "seismic data volume", a "seismic cube" may be used interchangeably to refer to a volume of seismic data (of any geometry) representing a subsurface or subterranean region of interest.

As used herein, "seismic trace" refers to the recorded data from a single seismic recorder or seismograph and typically plotted as a function of time or depth.

DETAILED DESCRIPTION OF THE PREFERRED EMBODIMENTS

Referring now to the Figures, embodiments of the disclosed methods will be described. As a threshold matter, embodiments of the methods may be implemented in numerous ways, as will be described in more detail below, including for example as a system (including a computer processing system), a method (including a computer implemented method), an apparatus, a computer readable medium, a computer program product, a graphical user interface, a web portal, or a data structure tangibly fixed in a computer readable memory. Several embodiments of the disclosed methods are discussed below. The appended drawings illustrate only typical embodiments of the disclosed methods and therefore are not to be considered limiting of its scope and breadth.

Embodiments of the disclosed methods assume a plurality of seismic traces have been acquired as a result of a seismic survey using any methods known to those of skill in the art. A seismic survey may be conducted over a particular geographic region whether it be in an onshore or offshore context. A survey may be a three dimensional (3D) or a two dimensional (2D) survey. The raw data collected from a seismic survey are unstacked (i.e., unsummed) seismic traces which contain digital information representative of the volume of the earth lying beneath the survey. Methods by which such data are obtained and processed into a form suitable for use by seismic processors and interpreters are well known to those skilled in the art. Additionally, those skilled in the art will recognize that the processing steps that seismic data would normally go through before it is interpreted: the choice and order of the processing steps, and the particular algorithms involved, may vary markedly depending on the particular seismic processor, the signal source (dynamite, vibrator, etc.), the survey location (land, sea, etc.) of the data, and the company that processes the data.

The goal of a seismic survey is to acquire a set of seismic traces over a subsurface target of some potential economic importance. Data that are suitable for analysis by the methods disclosed herein might consist of, for purposes of illustration only, a 2-D stacked seismic line extracted from a 3-D seismic survey or, a 3-D portion of a 3-D seismic survey. However, it is contemplated that any 3-D volume of seismic data might potentially be processed to advantage by the methods disclosed herein. Although the discussion that follows will be described in terms of traces contained within a stacked and migrated 3-D survey, any assembled group of spatially related seismic traces could conceivably be used. After the seismic data are acquired, they are typically brought back to the processing center where some initial or preparatory processing steps are applied to them.

The methods disclosed herein may be applied at the data enhancement stage, the general object of the disclosed methods being to use the seismic datasets to produce a "seismic output cube" which can then be utilized by the interpreter in his or her quest for subterranean exploration formations. It might also contain other attributes that are correlated with seismic hydrocarbon indicators. FIGS. 1A-F and 2 illustrate visually an embodiment of a method and includes a flow chart that illustrates an embodiment of the disclosed methods.

Referring now to FIGS. 1A-F and 2, in an embodiment, the method 200 of creating regional mosaics of multiple seismic surveys may generally include selecting two or more seismic survey datasets representing adjacent or adjoining subsurface or subterranean regions of interest in 201. Furthermore, although the Figures reference only two seismic survey datasets, any number of datasets may be utilized in embodiments of the disclosed methods insofar as the datasets represent proximate, neighboring or adjacent subsurface regions. The datasets may be processed in accordance with standard techniques and formatted into seismic data volumes or "cubes" 101A and 101B as shown in FIG. 1. The seismic volumes, of course, may not be limited to a "cube" geometry and may be formatted into any suitable volumetric geometry. Each seismic volume may have been processed or interpreted to contain one or more "horizons" 103A-103E in seismic volume 101A and 104A-104E in seismic volume 101B. The horizons represent chronostratigraphic layers or surfaces within the particular seismic volumes.

Figure 1A:
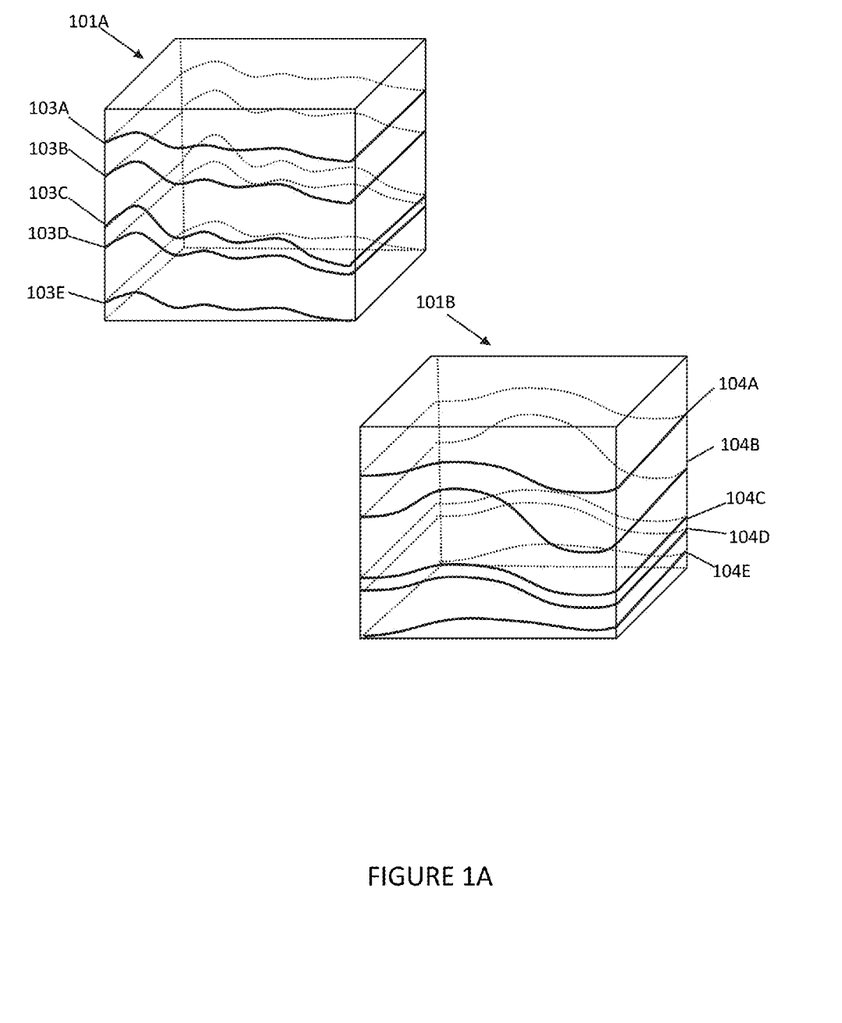
FIG. 1A illustrates a three-dimensional (3D) schematic representation of two seismic input volumes for use with embodiments of the methods for creating and interpreting animated mosaics of multiple seismic surveys.
Figure 1B:
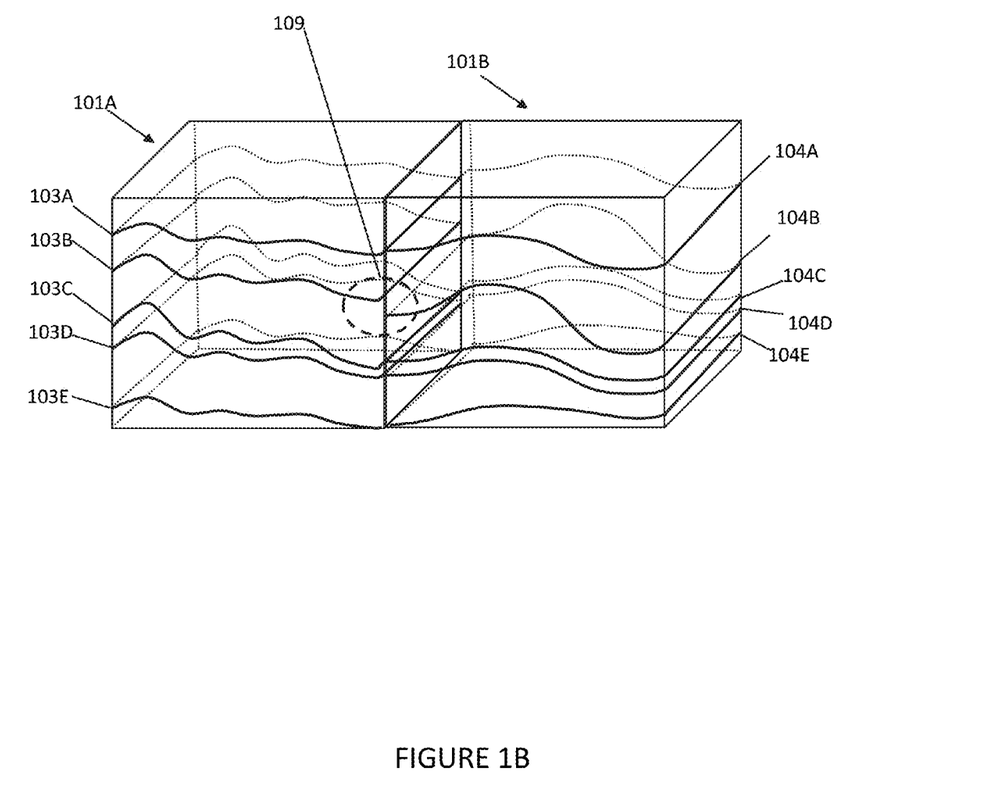
FIGS. 1B and 1C illustrate alignment of horizons between seismic volumes as used in an embodiment of methods for creating and interpreting animated mosaics of multiple seismic surveys.
Figure 1C:
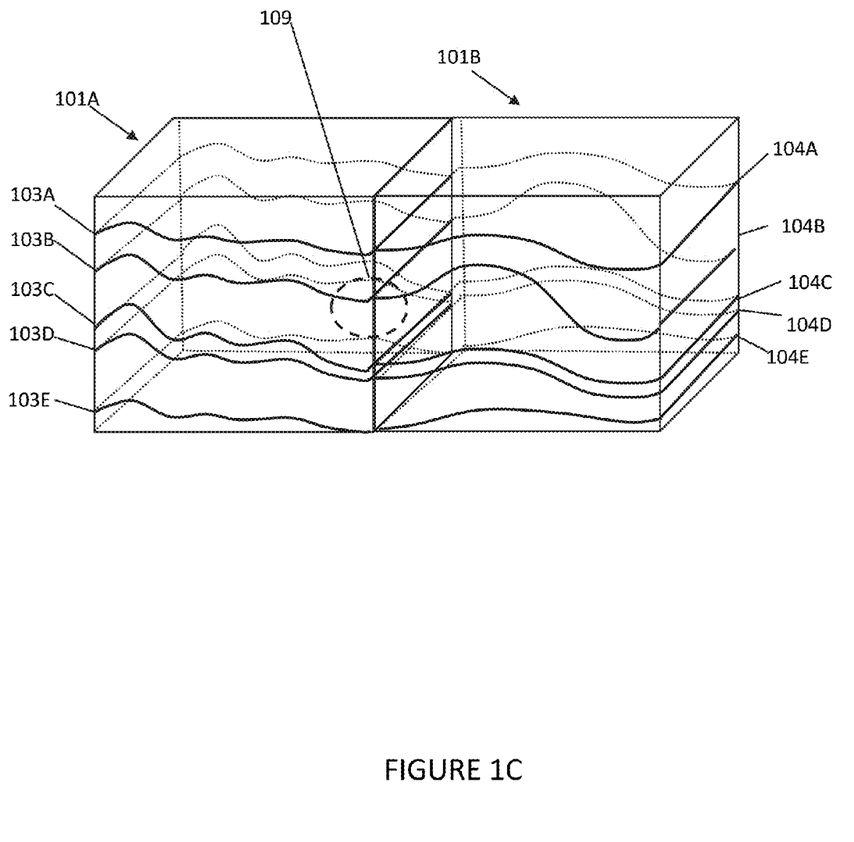
Figure 1D:
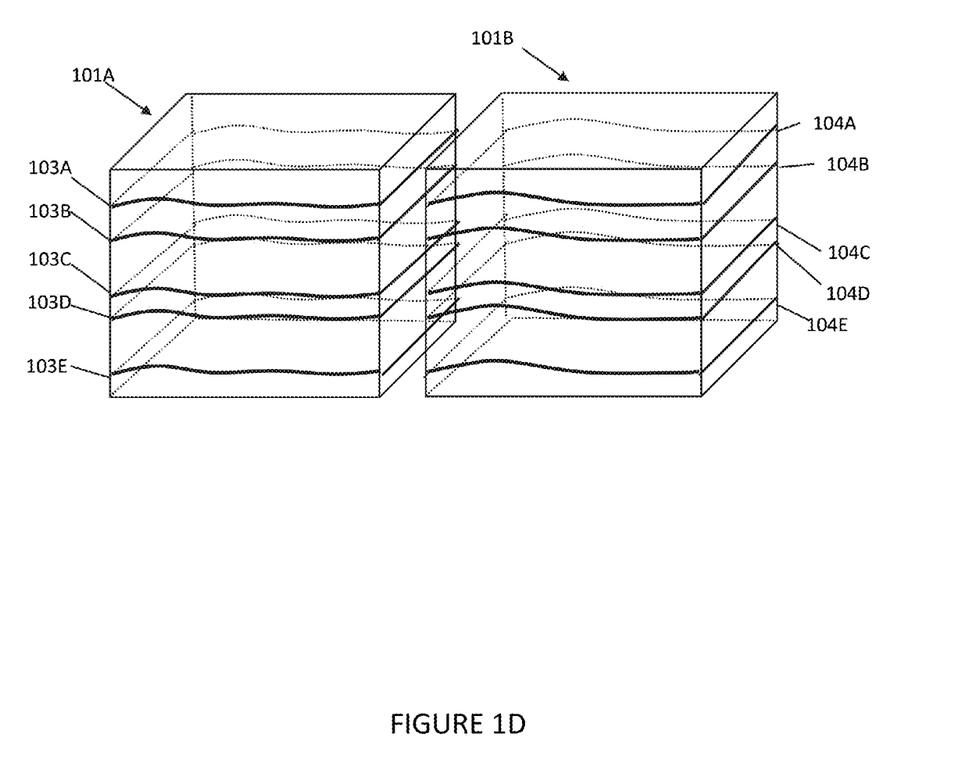
FIG. 1D illustrates a 3D schematic representation of flattening as used in an embodiment of the disclosed methods for creating and interpreting animated mosaics of multiple seismic surveys.

In an embodiment, the horizons may be picked or mapped manually based on the seismic data by a seismic interpreter. In an embodiment, as shown in FIGS. 1C and 1D, the horizons may be matched or aligned in 203 between the seismic volumes 101A and 101B. If any of the horizons are misaligned as shown in 109 of FIG. 1 C, the misaligned surface or horizon 104B may be adjusted such that it is aligned or matched with corresponding horizon 103B or vice versa. The above described operations may be performed in any suitable seismic interpretation software package. Examples may include without limitation, Schlumberger Petrel® software, Paradigm Epos® software, Landmark DecisonSpace® software, and the like.

Additionally, in some embodiments, erosion may be reconstructed on the horizons. In particular, where unconformities exist in any of the horizons, certain horizons or surfaces may be extended or adjusted allow flattening of the volume of data just below the unconformity.

Figure 1E:
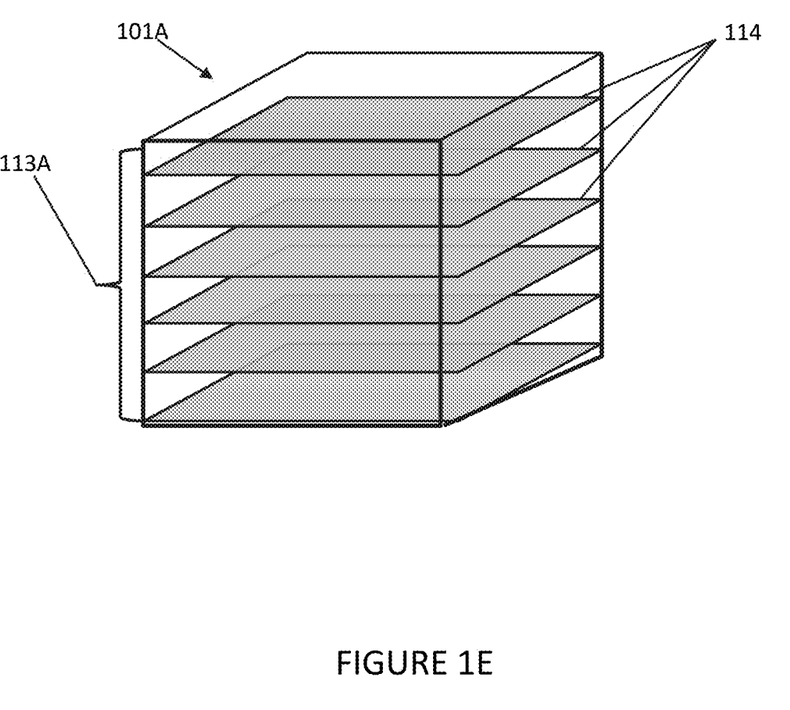
FIG. 1E illustrates a 3D schematic representation of rendering a seismic volume into a stack of digital images.
Figure 1F:
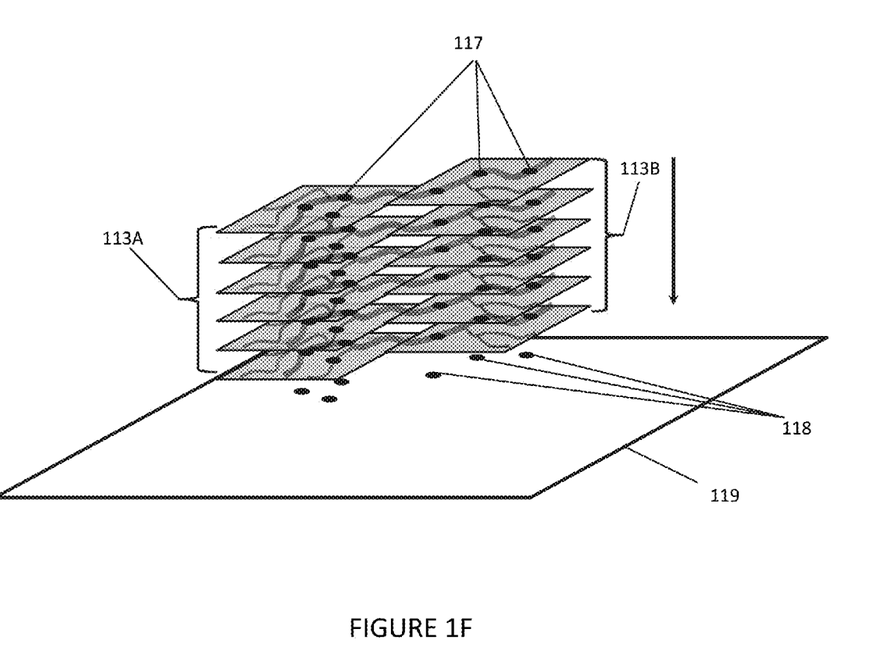
FIG. 1F illustrates a 3D representation of aligning the stacks or sequences of digital images from each seismic volume on to a basemap in an embodiment of the disclosed methods for creating and interpreting animated mosaics of multiple seismic surveys.

In an embodiment, wells 117 located within the subsurface region which are represented by the seismic volumes, may be output on to a basemap 119 for use a geographical or coordinate markers as shown in FIG. 1F. Well location and well data may also be incorporated into each of the seismic volumes 101A and 101B as will be discussed in more detail below.

Figure 2:
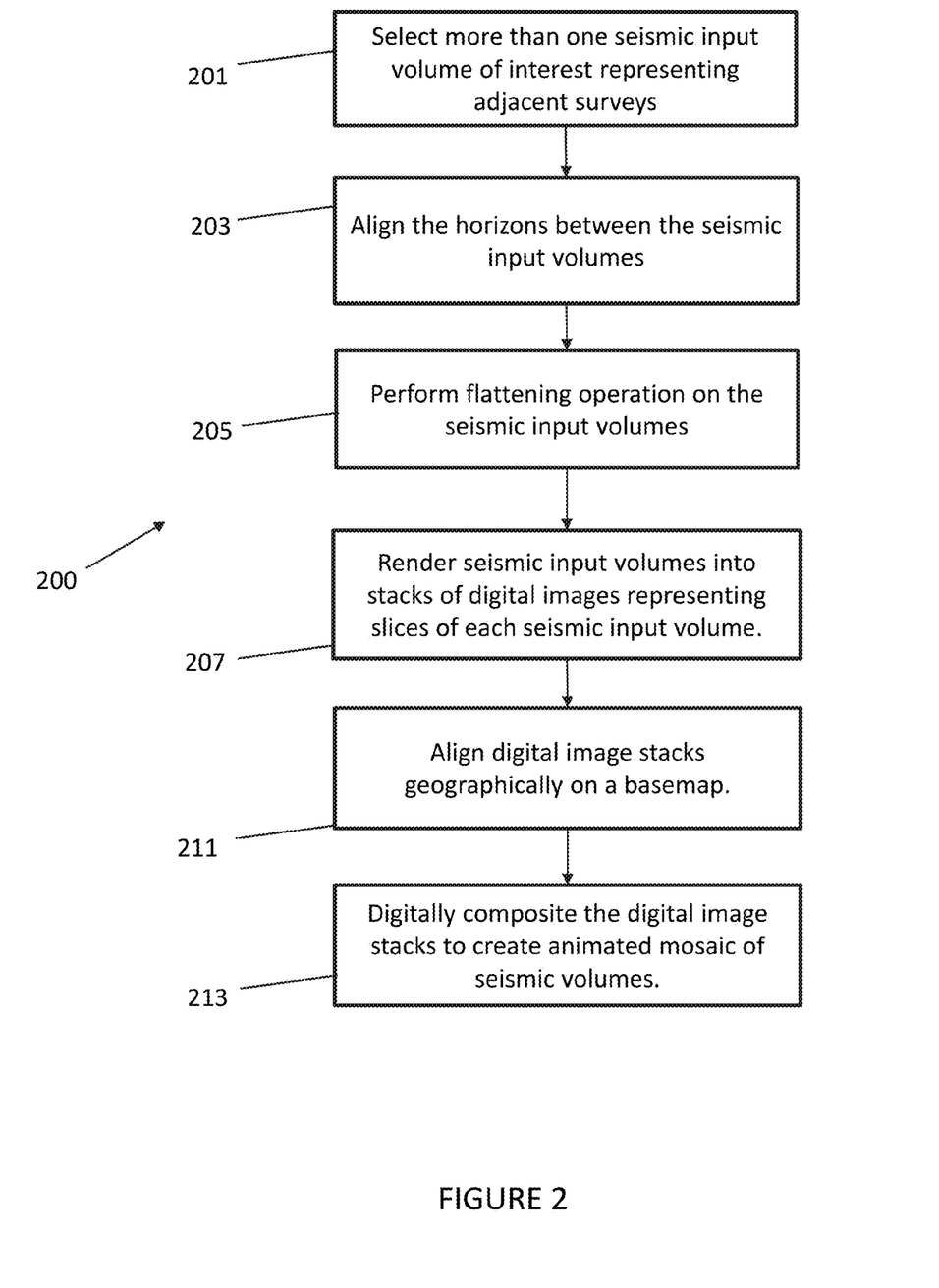
FIG. 2 illustrates a flowchart of an embodiment of the method for creating animated mosaics of multiple seismic surveys.

In embodiments, referring to FIG. 2, each seismic volume may be flattened in 205 according any number of techniques known to those of skill in the art. Seismic flattening is a technique or operation used to remove structures such as folds or faults, to help the interpreter recognize geological features based on one horizon only. One such exemplary technique is described in U.S. Pat. No. 7,769,545, which incorporated herein by reference in its entirety for all purposes. In the technique described in U.S. Pat. No. 7,769,545, the seismic volumes are automatically flattened without manual picking or horizons. In another embodiment, the horizons may be manually picked or determined and then a flattening operation may be performed. More particularly, the flattening operation may utilize a proportional flattening operation. The seismic volumes may be flattened based on variety of different seismic datasets or attributes such as without limitation, near, far, and/or full angle stacks, AVO, and the like.

In addition, the volumes may incorporate data obtained from wells (i.e. well data) located within each seismic volume. A flattening operation may also be performed on the well data to incorporate the well data into the flattened seismic volumes. Examples of well data may include without limitation petrophysical data, well log data, core data, geological data, etc.

The flattened seismic data volumes as well as the flattened well data may then be checked for quality control by comparing them to the original seismic input volumes. In an embodiment, a stratigraphic cross section of the flattened seismic volumes may be saved as a digital image for later use as will be described in more detail below.

Referring to FIGS. 1E and 1F, the seismic data volumes may be rendered into digital images in 207 of FIG. 2 using any one of commercially available 3D seismic visualization software packages into a visual 3-D display format. More particularly, now referring to FIGS. 1E and 1F, a plurality of slices 114 of each seismic volume (101A in FIG. 1E) are rendered to form a stack 113A of digital images. For example, a flattened seismic volume representing a vertical thickness of 4 kilometers, a digital image slice may be rendered every 2 meters. Accordingly, a stack of about 2000 digital images would be rendered. However, any suitable number of images may be rendered. In embodiments, the same number of images are rendered for each seismic volume. Thus, for example, volume 101A in FIG. 1A would be rendered with the same number of images as that of volume 101B. The stack 113A may be saved as a file or multiple files for export to another software package in a suitable format such as without limitation .jpeg format. However, the data volumes may be rendered into any suitable format such as without limitation, tiff, gif, png, and the like. An example of commercially available software includes VoxelGeo® QuickAnimator. Other examples may include without limitation workflows in Petrel or alternately, rendering to a virtual display, etc. However, any suitable software package may be used to render the seismic data volumes.

Figure 1G:
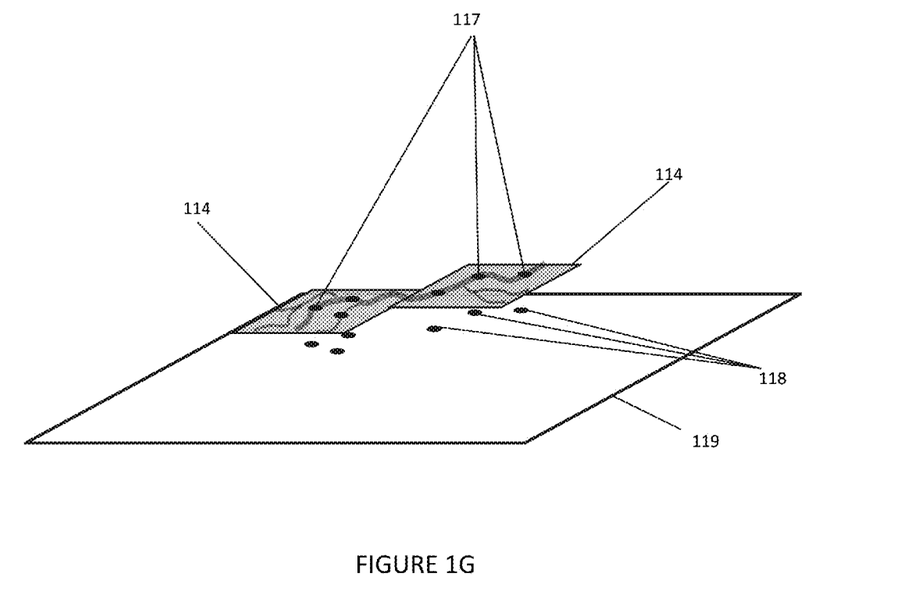
FIG. 1G illustrates a 3D representation of aligning or registering single images from each seismic volume on to a basemap in an embodiment of the disclosed methods for creating and interpreting animated mosaics of multiple seismic surveys.

Upon rendering of each seismic data volumes comprising the area of interest, the seismic movie or animation may be created using a digital compositing software package for creating digital motion graphics or digital animation such as without limitation Adobe After Effects as shown in 207 of FIG. 2. More specifically, an image representing a geographic basemap 119 may be loaded into the software package. The basemap image 119 encompasses the entire region for which each seismic volume covers. In other words, the basemap 119 may serve as a blank canvas upon which the seismic volumes may be aligned in the x-y coordinate space. The basemap may be created using suitable geophysical mapping or GIS software such as ArcGIS Each stack of digital images 113A and 113B, as shown in FIG. 1F, may be loaded into the software and aligned on the basemap 119 in the proper geographic location in 211 of FIG. 2. In an embodiment, this alignment may be performed manually by a user utilizing the software to individually align each digital stack 113A, 113B. More particularly, the geographical alignment or "registration" of the stacks may involve using one image 114 from each stack to ensure accurate alignment of the images relative to one another as shown in FIG. 1G. The registration or alignment may also involve adjusting the x-y scale of the images 114 from each stack so that they are all of the appropriate scale. Once a single image 114 from each stack is aligned, the computer may automatically align the remaining images in each stack to each other as shown in FIG. 1F. In embodiments, geographic markers 117 located in the seismic volumes may be used to accurately align the stacks 111A and 111B on to the basemap so as to accurately represent their proper location, which may also be referred to as "geo-referencing." In one embodiment, the geographic markers are wells 117 located in the subterranean regions which the stacks 111A and 111B represent. The real world locations of these wells 117 may be marked on the basemap as registration points 118 or markers. In other embodiments, other types of geographic markers may be used such as without limitation, the x-y geographic coordinates (i.e. longitude and latitude) of the corners of each seismic survey.

Figure 3:
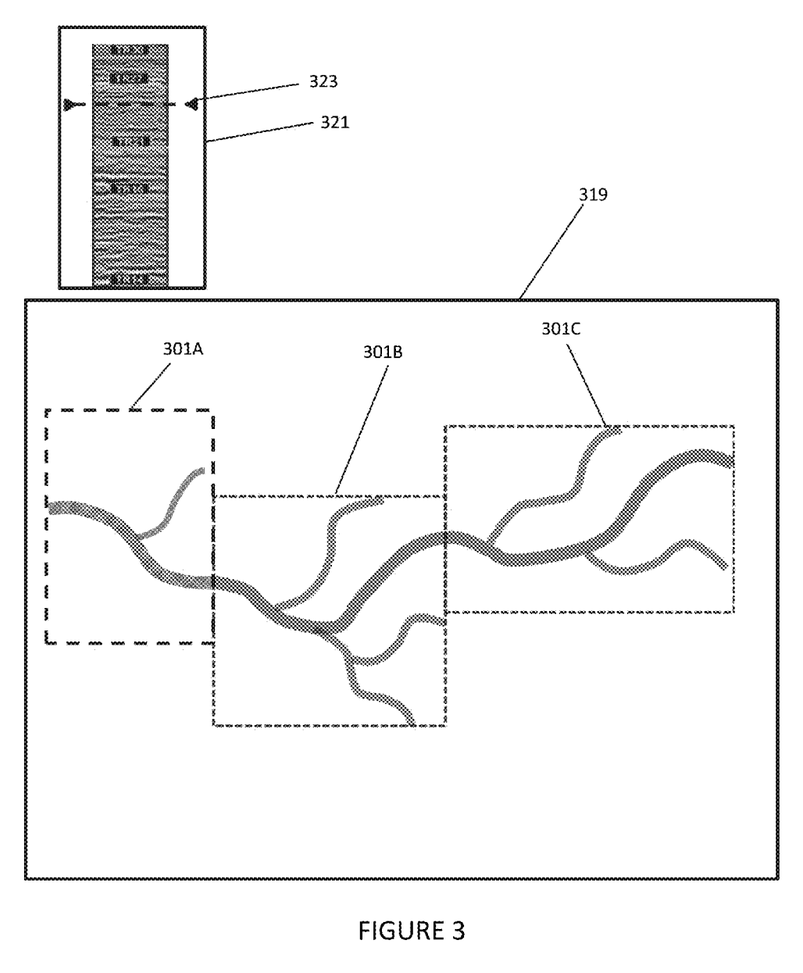
FIG. 3 illustrates an exemplary display on a computer monitor of the output from an embodiment of the method for creating animated mosaics of multiple seismic surveys

Once each stack of digital images 111A and 111B are aligned with respect to each other and also with respect to the markers (e.g. well locations) 118 on the basemap 119, the software may create an animation via digital compositing in 213 of FIG. 2 in the z-direction, as indicated by the arrow in FIG. 1F, which is displayed on a computer screen or monitor. FIG. 3 shows a schematic of an example of what a viewer may see displayed on a computer screen or monitor. In this example, three surveys 301A, 301B, and 301C have been aligned to each other and also on to basemap 319. The viewer sees a top down view of the rendered seismic volumes. The created animation or movie progresses the viewer in the z-direction (as indicated by the arrow in FIG. 1E) through the different rendered slices or images of the composite seismic volume or mosaic, thus allowing the viewer to see or visualize the progression of geological features as the viewer progresses deeper into the earth (i.e. geological time). Just like a movie, a user or viewer may rewind or forward the animation to go up and down the z-direction as desired.

The top down view afforded by the movie provides an excellent quality control tool on the precision of the stratigraphic correlation achieved between adjacent seismic surveys throughout the stratigraphic section. If miscorrelations are visible at some part of the stratigraphic section, one option may be to revise the mapped seismic horizons and re-flatten one or more of the seismic cubes. An alternative may be to adjust the local "time of play" of each movie cube via the suitable movie compositing software, according to a local "time remapping", which may allow the repair of minor stratigraphic miscorrelations in the movie.

In an embodiment, as the movie or animated mosaic plays, a moving arrow pointer or depth indicator 323 may display the vertical position (i.e. depth) of the current movie frame or slice on a stratigraphic cross-section 321 of one of the seismic volumes. As discussed briefly above, this cross-section may be saved after the flattening operation. This cross-sectional legend 321 may be labelled with regional sequence names, biostratigraphic and chemostratigraphic zones, and other labels without limitation. As such, as the movie or animated mosaic progresses or stops, so too does the indicator move up or down or stop on the cross-sectional legend 321. The animation of the mosaic or composite of the surveys may be saved as digital file format such as without limitation .mpeg, .mov, .mp4, .avi, and other suitable formats known to those of skill in the art for storage, export, and later playback. The movie format provides for flexible ease-of-access by users who otherwise would not be able to visualize and study the regional perspective provided by the multiple adjacent 3D seismic surveys which form a mosaic in the movie.

Figure 4:
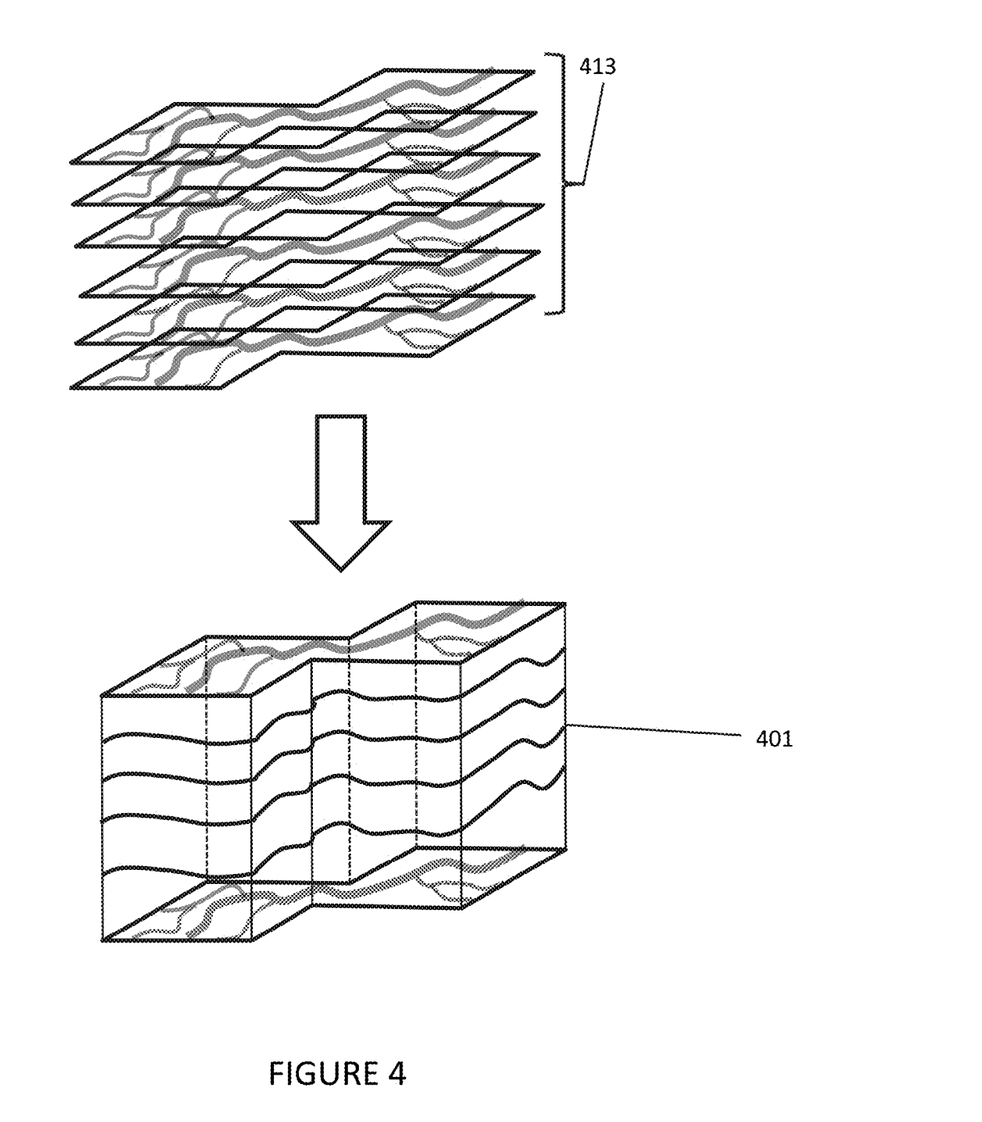
FIG. 4 illustrates a 3D representation of the conversion of a digital sequence from the animated mosaic into a seismic volume as used in an embodiment of the disclosed methods for creating and interpreting animated mosaics of multiple seismic surveys

In a further embodiment, the animated mosaic or composite may be saved as a graphic file sequence. For example, the animated mosaic or movie may be saved as a sequence of .tiff files which correspond to each frame or slice of the animated mosaic or movie. This is shown graphically in FIG. 4. After suitable color compression, the example sequence of tiff files can be reformatted, geographically-registered to world coordinates and displayed in a commercially-available seismic interpretation package, for example in Voxelgeo® or in Petrel®. As shown in FIG. 4, the software may render the combined digital image sequence 413 into a seismic volume 401 that may be used for seismic interpretation including gross depositional environment, reservoir facies, presence of potential source rock, and channel belt polygons and other stratigraphic features. The composite seismic output volume may be viewed as a z-slice or vertical plane. Accordingly, embodiments of the method may be used to effectively merge seismic data from different surveys into one large composite seismic volume.

Further, the regional flattened seismic data cube can be transformed to original two-way-time or to depth space via a regional displacement, or tau cube. The displacement cube is obtained by joining together in a mosaic the parts from each seismic survey of one or more mapped horizons, and running the flattening process on the regional horizon(s). The displacement cube, which is a by-product of the flattening, can then be used in reverse to transform the flattened movie mosaic seismic cube back into original two-way-time or depth space.

Figure 5:
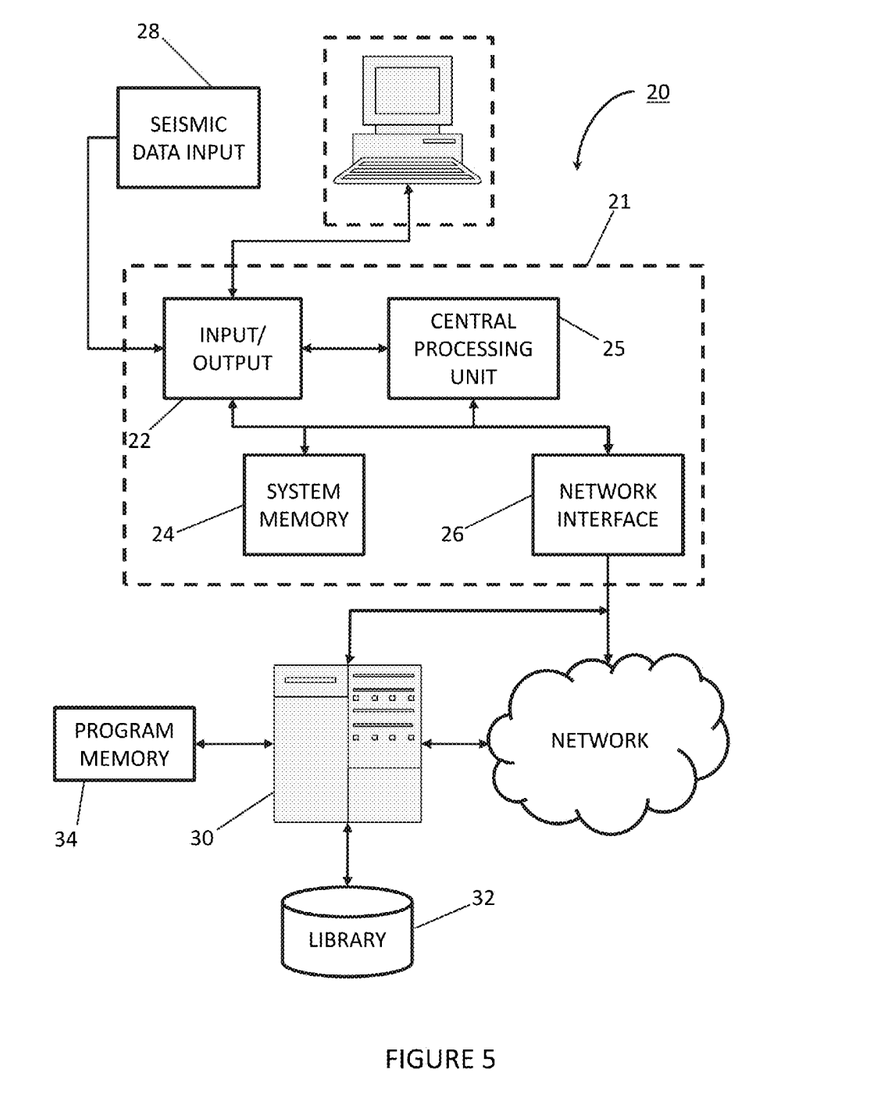
FIG. 5 illustrates a schematic of a system which may be used in conjunction with embodiments of the disclosed methods.

FIG. 5 illustrates, according to an example of an embodiment computer system 20, which may perform the operations described in this specification to perform the operations disclosed in this specification. In this example, system 20 is as realized by way of a computer system including workstation 21 connected to server 30 by way of a network. Of course, the particular architecture and construction of a computer system useful in connection with this invention can vary widely. For example, system 20 may be realized by a single physical computer, such as a conventional workstation or personal computer, or alternatively by a computer system implemented in a distributed manner over multiple physical computers. Accordingly, the generalized architecture illustrated in FIG. 5 is provided merely by way of example.

As shown in FIG. 5 and as mentioned above, system 20 may include workstation 21 and server 30. Workstation 21 includes central processing unit 25, coupled to system bus. Also coupled to system bus BUS is input/output interface 22, which refers to those interface resources by way of which peripheral functions P (e.g., keyboard, mouse, display, etc.) interface with the other constituents of workstation 21. Central processing unit 25 refers to the data processing capability of workstation 21, and as such may be implemented by one or more CPU cores, co-processing circuitry, and the like. The particular construction and capability of central processing unit 25 is selected according to the application needs of workstation 21, such needs including, at a minimum, the carrying out of the functions described in this specification, and also including such other functions as may be executed by computer system. In the architecture of allocation system 20 according to this example, system memory 24 is coupled to system bus BUS, and provides memory resources of the desired type useful as data memory for storing input data and the results of processing executed by central processing unit 25, as well as program memory for storing the computer instructions to be executed by central processing unit 25 in carrying out those functions. Of course, this memory arrangement is only an example, it being understood that system memory 24 may implement such data memory and program memory in separate physical memory resources, or distributed in whole or in part outside of workstation 21. In addition, as shown in FIG. 5, seismic data inputs 28 that are acquired from a seismic survey are input via input/output function 22, and stored in a memory resource accessible to workstation 21, either locally or via network interface 26.

Network interface 26 of workstation 21 is a conventional interface or adapter by way of which workstation 21 accesses network resources on a network. As shown in FIG. 5, the network resources to which workstation 21 has access via network interface 26 includes server 30, which resides on a local area network, or a wide-area network such as an intranet, a virtual private network, or over the Internet, and which is accessible to workstation 21 by way of one of those network arrangements and by corresponding wired or wireless (or both) communication facilities. In this embodiment of the invention, server 30 is a computer system, of a conventional architecture similar, in a general sense, to that of workstation 21, and as such includes one or more central processing units, system buses, and memory resources, network interface functions, and the like. According to this embodiment of the invention, server 30 is coupled to program memory 34, which is a computer-readable medium that stores executable computer program instructions, according to which the operations described in this specification are carried out by allocation system 30. In this embodiment of the invention, these computer program instructions are executed by server 30, for example in the form of a "web-based" application, upon input data communicated from workstation 21, to create output data and results that are communicated to workstation 21 for display or output by peripherals P in a form useful to the human user of workstation 21. In addition, library 32 is also available to server 30 (and perhaps workstation 21 over the local area or wide area network), and stores such archival or reference information as may be useful in allocation system 20. Library 32 may reside on another local area network, or alternatively be accessible via the Internet or some other wide area network. It is contemplated that library 32 may also be accessible to other associated computers in the overall network.

The particular memory resource or location at which the measurements, library 32, and program memory 34 physically reside can be implemented in various locations accessible to allocation system 20. For example, these data and program instructions may be stored in local memory resources within workstation 21, within server 30, or in network-accessible memory resources to these functions. In addition, each of these data and program memory resources can itself be distributed among multiple locations. It is contemplated that those skilled in the art will be readily able to implement the storage and retrieval of the applicable measurements, models, and other information useful in connection with this embodiment of the invention, in a suitable manner for each particular application.

According to this embodiment, by way of example, system memory 24 and program memory 34 store computer instructions executable by central processing unit 25 and server 30, respectively, to carry out the disclosed operations described in this specification, for example, by way of which seismic volumes may be processed, flattened, rendered, or animated into the composites or mosaics of multiple seismic surveys. These computer instructions may be in the form of one or more executable programs, or in the form of source code or higher-level code from which one or more executable programs are derived, assembled, interpreted or compiled. Any one of a number of computer languages or protocols may be used, depending on the manner in which the desired operations are to be carried out. For example, these computer instructions may be written in a conventional high level language, either as a conventional linear computer program or arranged for execution in an object-oriented manner. These instructions may also be embedded within a higher-level application. Such computer-executable instructions may include programs, routines, objects, components, data structures, and computer software technologies that can be used to perform particular tasks and process abstract data types. It will be appreciated that the scope and underlying principles of the disclosed methods are not limited to any particular computer software technology. For example, an executable web-based application can reside at program memory 34, accessible to server 30 and client computer systems such as workstation 21, receive inputs from the client system in the form of a spreadsheet, execute algorithms modules at a web server, and provide output to the client system in some convenient display or printed form. It is contemplated that those skilled in the art having reference to this description will be readily able to realize, without undue experimentation, this embodiment of the invention in a suitable manner for the desired installations. Alternatively, these computer-executable software instructions may be resident elsewhere on the local area network or wide area network, or downloadable from higher-level servers or locations, by way of encoded information on an electromagnetic carrier signal via some network interface or input/output device. The computer-executable software instructions may have originally been stored on a removable or other non-volatile computer-readable storage medium (e.g., a DVD disk, flash memory, or the like), or downloadable as encoded information on an electromagnetic carrier signal, in the form of a software package from which the computer-executable software instructions were installed by allocation system 20 in the conventional manner for software installation.

While the embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. Accordingly, the scope of protection is not limited by the description set out above, but is only limited by the claims which follow, that scope including all equivalents of the subject matter of the claims.

The discussion of a reference is not an admission that it is prior art to the present invention, especially any reference that may have a publication date after the priority date of this application. The disclosures of all patents, patent applications, and publications cited herein are hereby incorporated herein by reference in their entirety, to the extent that they provide exemplary, procedural, or other details supplementary to those set forth herein.

What is claimed is:

1. A method of creating a mosaic from a plurality of different seismic surveys, the method comprising:
    (a) selecting a plurality of seismic input volumes stored on an allocation system, wherein each seismic input volume is a result of a different seismic survey comprising data recorded by a seismic recorder and received at a seismic input interface of the allocation system, wherein the seismic input volumes are representative of one or more subterranean regions of interest which are at least partially adjacent to one another, and wherein each seismic input volume comprises one or more horizons representing chronostratigraphic layers;
    (b) aligning, by the allocation system, the horizons of each seismic input volume to the horizons of the other seismic input volumes;
    (c) performing a flattening operation, by the allocation system, for each seismic input volume to create a plurality of flattened seismic volumes;
    (d) rendering, by the allocation system, each flattened seismic volume to create a stack of digital images representing at least a portion of the horizons in each flattened seismic volume;
    (e) receiving an input, at the allocation system, the input aligning a first digital image from each flattened seismic volume, and, once aligned, using, by the allocation system, the first digital image from each flattened seismic volume to align a remaining set of digital images in each flattened seismic volume geographically on to a basemap; and
    (f) digitally compositing the stacks of digital images to create an animated mosaic of the plurality of seismic input volumes, the animated mosaic comprising an animated progression through the one or more horizons of all the seismic input volumes.

2. The method of claim 1, further comprising:
    (g) saving, by the allocation system, the animated mosaic as a sequence of digital images; and
    (h) converting, by the allocation system, the sequence of digital images into a seismic output volume, the seismic output volume comprising a composite of all of the seismic input volumes.

3. The method of claim 2, further comprising transforming, by the allocation system, the seismic output volume from stratigraphically-flattened space into two-way-time or depth space.

4. The method of claim 2, wherein (g) comprises saving the animated mosaic as a TIFF sequence.

5. The method of claim 1, further comprising repairing stratigraphic miscorrelations between adjacent seismic surveys in the animated mosaic by local time remapping of each seismic survey.

6. The method of claim 1, further comprising displaying, by the allocation system, the animated mosaic on a computer monitor and simultaneously displaying a cross-section of one or more of the flattened seismic volumes, wherein the cross-section of the one or more flattened seismic volumes comprises a depth marker indicating a depth of the animated mosaic being displayed on the computer monitor.

7. The method of claim 1, wherein (e) comprises using well locations in each seismic input volume as geographical markers to align each stack to the basemap.

8. The method of claim 1 wherein (c) uses a proportional flattening operation to flatten each seismic input volume.

9. The method of claim 1 wherein (c) further comprises including well data in the seismic input volume and performing a flattening operation on the well data.

10. The method of claim 1 wherein the stack of digital images in (d) are saved as .jpg, .tif, .gif, .bmp, .png, .raw, or combinations thereof.

11. The method of claim 1 wherein (f) comprises saving the animated mosaic as a .mov file.

12. An allocation system, comprising:
    a seismic input interface for receiving a plurality of seismic input volumes from a seismic recorder, the seismic input volumes comprising a plurality of seismic traces and one or more horizons representing chronostratigraphic layers;
    a memory resource;
    input and output functions for presenting and receiving communication signals to and from a human user;
    one or more central processing units for executing program instructions; and program memory, coupled to the central processing unit, for storing a computer program including program instructions that, when executed by the one or more central processing units, cause the computer system to perform a plurality of operations comprising:
        (a) selecting the seismic input volumes stored on the allocation system, wherein each seismic input volume is a result of a different seismic survey comprising data recorded by the seismic recorder and received by the seismic input interface of the allocation system, wherein the seismic input volumes are representative of one or more subterranean regions of interest which are at least partially adjacent to one another;
        (b) aligning, by the allocation system, the horizons of each seismic input volume to the horizons of the other seismic input volumes;

(c) performing a flattening operation, by the allocation system, for each seismic input volume to create a plurality of flattened seismic volumes;

(d) rendering, by the allocation system, the flattened seismic volumes to create a stack of digital images representing at least a portion of the horizons in each flattened seismic volume;

(e) receiving an input, at the allocation system, the input aligning a first digital image from each flattened seismic volume, and, once aligned, using, by the allocation system, the first digital image from each flattened seismic volume to align a remaining set of digital images in each flattened seismic volume geographically on to a basemap; and (f) digitally compositing the stacks of digital images to create an animated mosaic of the plurality of seismic input volumes, the animated mosaic comprising an animated progression of the one or more horizons of all the seismic input volumes.

13. The system of claim 12, further comprising:

(g) saving, by the allocation system, the animated mosaic as a sequence of digital images; and (h) converting, by the allocation system, the sequence of digital images into a seismic output volume, the seismic output volume comprising a composite of all of the seismic input volumes.

14. The system of claim 13, wherein (g) comprises saving the animated mosaic as a TIFF sequence.

15. The system of claim 12, the plurality of operations further comprising displaying, on the allocation system, the animated mosaic on a computer monitor and simultaneously displaying a cross-section of one or more of the flattened seismic volumes, wherein the cross-section of the one or more flattened seismic volumes comprises a depth marker indicating a depth of the animated mosaic being displayed on the computer monitor.

16. The system of claim 12, wherein (e) comprises using well locations in each seismic input volume as geographical markers to align each stack to the basemap.

17. The system of claim 12 wherein (c) uses a proportional flattening operation to flatten each seismic input volume.

18. The system of claim 12 wherein (c) further comprises including well data in the seismic input volume and performing a flattening operation on the well data.

19. The system of claim 12 wherein the stack of digital images in (d) are saved as .jpg, .tif, .gif, .bmp, .png, .raw, or combinations thereof.

20. The system of claim 12, the plurality of operations further comprising transforming, by the allocation system, the seismic output volume from stratigraphically-flattened space into two-way-time or depth space.

21. The system of claim 12, the plurality of operations further comprising repairing stratigraphic miscorrelations between adjacent seismic surveys in the animated mosaic by local time remapping of each seismic survey.

* * * * *